No. 12,485. REISSUED MAY 22, 1906.

H. H. SPONENBURG.

RAILWAY RAIL STAY.

APPLICATION FILED MAR. 31, 1906.

2 SHEETS—SHEET 1

Witnesses:
J. B. Weir
W. P. Kilroy

Inventor:
Hiram H. Sponenburg
By Raymond & Barnett
Attys.

No. 12,485. REISSUED MAY 22, 1906.

H. H. SPONENBURG.

RAILWAY RAIL STAY.

APPLICATION FILED MAR. 31, 1906.

2 SHEETS—SHEET 2.

Witnesses:
J. B. Weir
W. P. Kilroy

Inventor
Hiram H. Sponenburg
By Raymond H. Barnett
Attys

UNITED STATES PATENT OFFICE.

HIRAM H. SPONENBURG, OF WADSWORTH, ILLINOIS, ASSIGNOR OF ONE-HALF TO EDWARD LAAS, OF OTTUMWA, IOWA.

RAILWAY-RAIL STAY.

No. 12,485. Specification of Reissued Letters Patent. Reissued May 22, 1906.

Original No. 799,361, dated September 12, 1905. Application for reissue filed March 31, 1906. Serial No. 309,230.

*To all whom it may concern:*

Be it known that I, HIRAM H. SPONENBURG, of Wadsworth, in the county of Lake, in the State of Illinois, have invented new and useful Improvements in Railway-Rail Stays, of which the following, taken in connection with the accompanying drawings, is a full, clear, and exact description.

This invention relates to railway-rail stays of that class composed of two jaws which are adapted to grip the flanges of the rail by the action of a bolt connecting the jaws and which are disposed to abut against one side of the cross-tie for the purpose of preventing longitudinal creeping of the rails and resultant throwing of the track out of alinement and gage.

The present invention is an improvement upon the form of rail-stay shown and described in my United States Letters Patent No. 779,104, dated January 3, 1905, and its object is to provide a rail-stay which shall be more efficient in resisting the creeping movement of the rail and at the same time to produce a construction which shall be simple, strong, and durable, and can be readily applied to the rail, which shall also be inexpensive.

To that end the invention consists in the novel arrangement and combination of the component parts of the rail-stay hereinafter fully described, and set forth in the claims.

Figure 1:
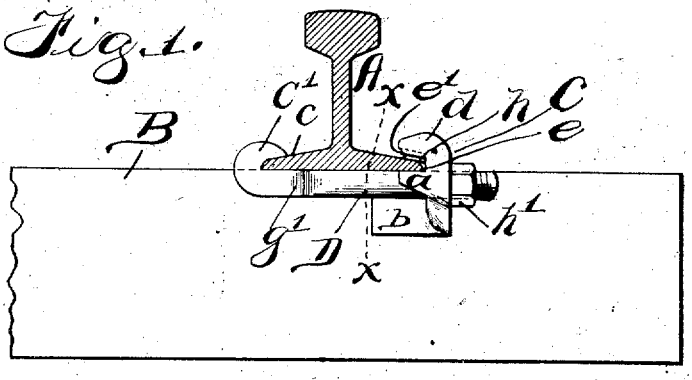
Figure 2:
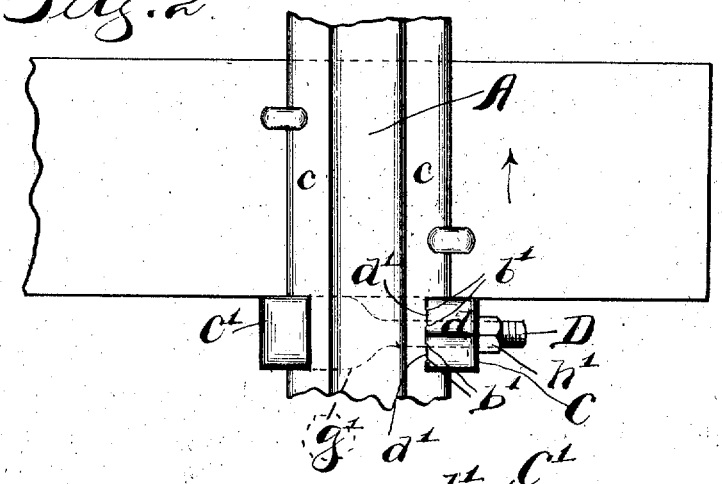
Figure 3:
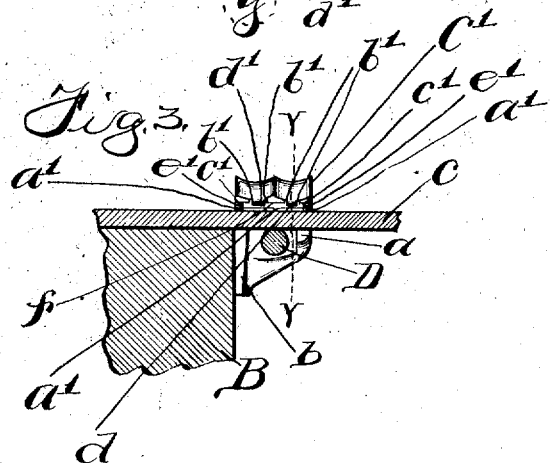
Figure 4:
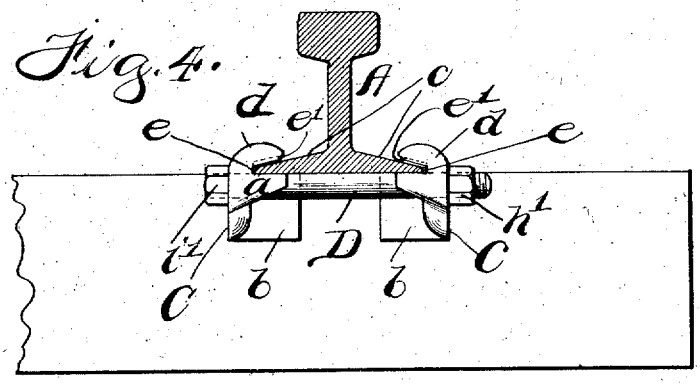
Figure 5:
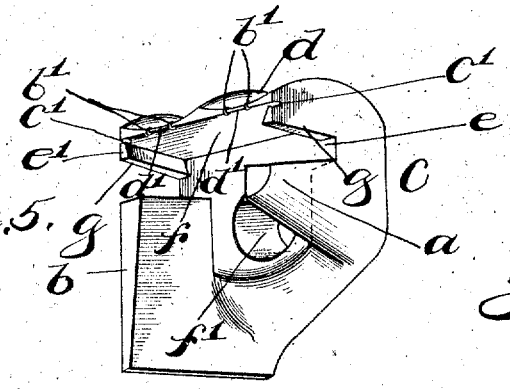
Figure 6:
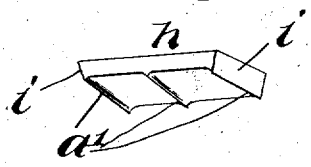
Figure 7:
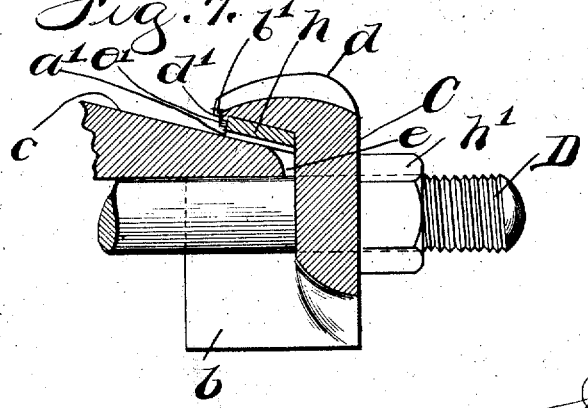

In the accompanying drawings, Figure 1 shows a transverse section of a rail provided with my improved rail-stay. Fig. 2 is a plan view of the same and indicating by an arrow the direction in which the rail tends to creep. Fig. 3 is a vertical section on the dotted line X X in Fig. 1. Fig. 4 is a transverse section of a rail provided with a modified form of the rail-stay. Fig. 5 is an enlarged detail perspective view of one of the rail-gripping jaws minus the chilled iron or steel serrated plate. Fig. 6 is an enlarged detail perspective view of said plate, and Fig. 7 is a vertical section on the dotted line Y Y in Fig. 3.

Referring to the said drawings, A represents the well-known T-rail, which is supported upon the cross-tie B and spiked thereto in the usual manner.

C denotes a rail-gripping jaw embodying my present invention. Said jaw consists of a block composed of malleable iron or other suitable metal and is formed with an ear *a* and breast *b*, projecting at right angles from the opposite side portions thereof and which are provided with bearing-surfaces by which they grip the bottom of the flange *c* of the rail A, said breast being disposed to abut against the side of the cross-tie B. The upper portion of said block is formed with an overhanging lip *d*, which is adapted to grip the top of the rail-flange *c*. The inner face of said lip is disposed at an angle in relation to the gripping-faces on top of ear *a* and breast *b*, thereby producing a groove *e* corresponding to and receiving the said rail-flange. Said inner face of the lip *d* is formed with a recess or pocket *f*, having undercut or dovetail end walls, as indicated at *g g*.

*h* denotes a gripping-plate, which is composed of chilled iron or steel and is disposed in the said recess *f*. This plate has its ends beveled, as indicated at *i i*, to correspond with the walls *g g* of the recess, and is thus supported in the said recess, and its thickness is greater than the depth of the recess in order that the lower face of this plate shall project below the lip, which face is provided with serrations *a′ a′ a′*, which are caused to be embedded in the top of the flange *c* when the jaw is firmly clamped onto the rail in the manner which shall be shortly explained.

I prefer to provide the free edge of the lip with short slots, disposed in pairs, as indicated at *b′ b′*, and to provide the corresponding ends of each of the walls *g* with similar slots *c′*. By providing these slots portions of the edge of the lip (indicated at *d′ d′*) may be bent down to form tongues, and the end portions of the walls *g g* (indicated at *e′ e′*) may be bent inward to form like tongues, which tongues serve to lock the plate *h* in the recess, as more clearly shown in Figs. 5 and 7 of the drawings.

The jaw C is provided with a transverse aperture *f′*, which is disposed centrally between the ear *a* and breast *b* for the reception of a bolt D, and which has its top in a plane with the bottom of the rail.

In some instances I prefer to use the form of rail-stay shown in Figs. 1 and 2 of the drawings, in which only one jaw C is employed and is applied to one of the rail-flanges *c* in the manner aforesaid. In this case I use a plain hook-shaped jaw C′, which grips the other flange and is formed on one end of a strap or bar *g′*, which extends across the under side of the rail A. The opposite end portion of the strap is formed cylindrical and screw-threaded and constitutes the bolt D, passing through the aforesaid aperture *f'* of the jaw C and provided with a nut *h'*, engaging the outer face of the jaw. By tightening the said nut the jaws C C' are caused to be firmly clamped to the rail-flanges and the serrations *a' a' a'* of the aforesaid plate *h* become embedded in the top of the said flanges. By thus clamping the jaws onto the rail with the breast *b* abutting against the cross-tie B it is obvious that the stay will effectually resist the creeping of the rail. By referring to Fig. 4 of the drawings it will be observed that two of these jaws C C may be employed. In this form of rail-stay I employ an ordinary bolt D, formed with a head *i'*, engaging the outer face of one jaw and provided with the nut *h'* engaging the corresponding face of the other jaw.

If desired, the tongues *d' e'* may be dispensed with, thereby rendering the plate *h* removable.

It will be observed that when the jaws and rail-flange are constructed as shown the horizontally-tapered flange of the rail serves as a wedge, which is forced between the upper and lower members of the jaws when the jaws are forced toward each other. Consequently the teeth *a'* are wedged into a horizontal face of the rail-flange. As is well known in this art, it is a common practice to apply such jaws to the rail-flange by driving them on with a sledge-hammer, the bolt D being then inserted and the nut *h'* applied to hold the jaws in such position, although of course the tightening of the nut *h'* may be used to draw the jaws together, if desired. Whenever the jaws are forced tightly toward each other, whether by means of a sledge-hammer or otherwise, the wedging action which results from the tapered form of the rail-flange forces the teeth *a'* to grip tightly into the rail-flange, so that if the nut *h'* becomes loosened the jaws will have a tendency to retain their grip upon the rail-flange. Inasmuch as the problem of preventing the unlocking of nuts is oftentimes a troublesome one, especially when the device is subjected to the vibrations incident to the use of a railroad-track, this feature of my present invention possesses peculiar value and utility.

What I claim is—

1. The improved rail-stay comprising a jaw abutting against the side of the cross-tie and formed with a groove receiving the rail-flange, a flange-gripping plate confined at the top of said groove, and a bolt passing across the under side of the rail and clamping the jaw onto the rail as set forth.

2. The improved rail-stay comprising a cast-metal jaw abutting against the side of the cross-tie and formed with a groove receiving the rail-flange, a hard-metal flange-gripping plate confined in the groove and provided with serrations or teeth adapted to embed themselves in the top of the flange, and means for clamping the jaw onto the rail as set forth.

3. The improved rail-stay comprising a jaw provided with means for clamping the same onto the rail-flange and with means abutting against the side of the cross-tie, said jaw being formed with a surface gripping the bottom of the flange and with an undercut overhanging lip, and a plate confined in said undercut portion and gripping the top of the flange as set forth.

4. A railway-rail stay comprising a jaw abutting against the cross-tie and formed with a groove receiving the rail-flange, a hard-metal flange-gripping plate disposed in the top of the groove, the said jaw being provided with bent portions confining the plate in its position, and means clamping the jaw onto the rail as set forth.

5. A railway-rail stay comprising a jaw consisting of a block provided with an aperture and formed with an abutment engaging the cross-tie and with a groove receiving the rail-flange, and the top of the groove provided with a recess, a chilled-iron serrated plate disposed in said recess and gripping the top of the flange, tongues formed on the said jaw at the groove and locking the plate in the recess, and a suitably-supported bolt passing across the under side of the rail and extending through the aperture of the jaw and provided with a nut engaging the outer face of the jaw and forcing the jaw onto the rail and causing the serrations of the aforesaid plate to be embedded in the flange as set forth.

6. A railway-rail stay comprising a jaw consisting of a block formed with a breast projecting at right angles therefrom and abutting against the cross-tie and with a correspondingly-projecting ear, said breast and ear provided with bearings gripping the bottom of the rail-flange and the block provided with a transverse aperture disposed between the breast and ear, an overhanging lip formed on the jaw and provided with an undercut recess, a chilled iron or steel plate confined in said recess and provided with a serrated face gripping the top of the rail-flange, a suitably-sustained bolt passing across the under side of the rail and extending through said aperture, and a nut on the bolt and engaging the outer face of the block for the purpose set forth.

7. A railway-rail stay comprising a jaw abutting against the side of the cross-tie and formed with a groove receiving one of the rail-flanges and provided with a serrated flange-gripping plate confined at the top of the groove, a suitable jaw gripping the other rail-flange, and a bolt drawing said jaws into clamping positions as set forth.

8. A railway-rail stay comprising a jaw abutting against the cross-tie and formed with a groove receiving one of the rail-flanges and with a recess in the top of the groove, a chilled iron or steel plate disposed in said recess and provided with a serrated face for gripping the top of said flange, a hook-shaped jaw gripping the other rail-flange and abutting against the cross-tie, and a bolt forcing said jaws into clamping positions as set forth.

9. A railway-rail stay comprising a jaw abutting against the side of the cross-tie and formed with a groove receiving one of the rail-flanges and provided with a serrated hard-metal flange-gripping plate confined at the top of the groove, and a transverse aperture below the groove, a hook-shaped jaw gripping the other rail-flange, a bolt formed integral with the latter jaw and passing across the under side of the rail and through the aforesaid aperture, and a nut on said bolt and engaging the outer face of this apertured jaw as and for the purpose set forth.

10. In an anticreeping device for rails, the combination of a jaw having upper and lower members adapted to grip over the edge of a rail-flange, and a piece set in one of said jaws and arranged to bite into the upper face of said flange.

11. In an anticreeping device for rails, the combination of a jaw having upper and lower members adapted to grip over the edge of a rail-flange, and a piece set in one of said jaw members and provided with a tooth arranged to bite into a horizontal face of said flange.

12. The combination of a pair of jaws adapted to grip opposite edges of the flange of a railway-rail, of a toothed member inserted in one of said jaws and arranged to bite into said flange with a wedging action when said jaws are forced toward each other, so as to grip said flange.

13. The combination with a railway-rail having a horizontally-tapered flange, of a pair of jaws adapted to engage opposite edges of said flange, and a toothed member inserted in one of said jaws so as to bite into a horizontal face of the rail-flange when the jaw carrying said toothed member is wedged upon said rail-flange.

14. An anticreeping device for railway-rails, comprising a jaw having upper and lower members adapted to grip over the edge of a rail-flange, a separate hard-metal piece, having a sharpened edge, set in one of said members in such manner that said edge extends transversely to the rail, and means for drawing said jaw transversely over the edge of the rail-flange, whereby said sharpened edge is caused to bite into a face of said rail-flange.

15. An anticreeping device for rails, comprising a clamping-jaw having a wedge-shaped recess adapted to receive the edge of a rail-flange, a knife-edge set transversely in one face of said recess and adapted to bite into a face of the rail-flange when said jaw is forced thereover, and means for holding said jaw in position on said flange.

HIRAM H. SPONENBURG.

Witnesses:
O. R. Barnett,
G. Y. Skinner.